INVENTOR.
ROBERT D. HAWKINS
BY
ATTORNEY

United States Patent Office 3,332,757
Patented July 25, 1967

---

3,332,757
METHOD OF MAKING FIBER OPTIC FREQUENCY RESPONSIVE DEVICE
Robert D. Hawkins, Greenlawn, N.Y., assignor to Sperry Rand Corporation, Great Neck, N.Y., a corporation of Delaware
Filed Dec. 13, 1963, Ser. No. 330,409
3 Claims. (Cl. 65—4)

This invention relates to frequency responsive devices and the method of making the same and particularly to a device consisting of a plurality of energy transmitting elements in which the elements have varying resonant frequencies with respect to each other, generally of the type shown in U.S. patent application S.N. 185,064, entitled, "Frequency Responsive Apparatus," filed Apr. 4, 1962, in my name, now Patent 3,213,197, and in U.S. patent application S.N. 285,551, entitled, "Method of Making Frequency Responsive Device," filed May 31, 1963, in my name and T. Stinis.

A typical energy transmitting device as produced by the present invention has a large number of tiny, spaced, parallel fibers which, for example, may be light-conductive fibers secured to a transparent light transmitting base member to form an array. Each of the fibers has substantially the same light transmission and structural characteristics and each fiber has substantially the same cross-sectional area. The fibers are secured to the base member in cantilevered fashion in such a manner as to have varying free lengths that vibrate at varying resonant frequencies which are a function of the length that each of the fibers projects from the base member when the base member is vibrated. A light source adjacent the base member transmits light which is directed through the base member and thence through the parallel paths defined by the parallel fibers in the absence of vibration. By vibrating the array, certain of the fibers resonate thereby providing an output signal in accordance with the teaching of said U.S. patent applications 185,064 and 285,551.

With this type of device, miniaturization is very desirable to realize a higher density of fibers and hence a greater information processing capability. Further, a large number of arrays are usually incorporated into the overall apparatus and miniaturization results in a more compact overall apparatus requiring proportionally less power to drive each array.

The primary problem when endeavoring to produce miniaturized arrays of this type is the inability to control selective etching processes in order to create an accurate frequency-distribution defining interface between the base member and the fibers having a prescribed contour from which the cantilevered fibers extend to have varying free lengths. With respect to miniaturized arrays, known etching processes contain too many uncontrolled variables to obtain arrays having consistent characteristics.

It is therefore a primary object of the present invention to provide an energy transmitting device having an array which is responsive to a plurality of frequencies having an accurately contoured interface.

It is a further object of the present invention to provide a miniaturized energy transmitting device having a plurality of cantilevered fibers emanating from an accurately contoured surface.

It is an additional object of the preesnt invention to provide a method of producing an energy transmitting device having a plurality of cantilevered elements supported to resonate at a plurality of frequencies.

These and other objects of the present invention are accomplished by a frequency responsive device having a plurality of flexible transmitting elements that are secured to an accurately contoured surface of a separate base member to form an integral array in which the elements have varying free cantilevered lengths and are responsive to a plurality of frequencies while being spaced with respect to each other.

Referring to the drawings which are all greatly enlarged,

The present invention will be described with respect to a frequency responsive array of energy transmitting fibers in which the fibers have a circular cross-section and consist of flexible flint glass which transmits light. It will be appreciated that the present invention is also suitable for frequency responsive arrays of elements which transmit energy in other ways and involving elements shaped other than described and of a material other than glass.

Figure 1:
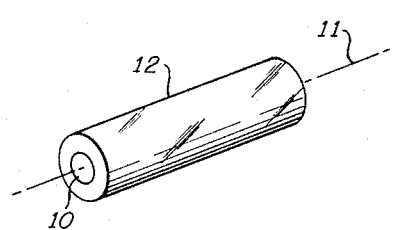
FIG. 1 is a perspective view of a single coated fiber.
Figure 2:
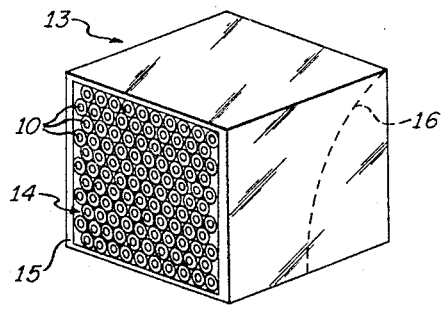
FIG. 2 is a perspective view of a matrix block comprising a plurality of fibers secured to each other.

Referring to the drawings wherein like reference characters indicate like parts throughout the various views, the device of the present invention is formed of a plurality of light conducting fibers 10 each as shown in FIG. 1, preferably of a light conducting, relatively high index of refraction flint glass having a longitudinal axis 11 and circular cross-section. In surrounding relationship with respect to each of the fibers 10 except at the extremity of the fibers 10 is a coating 12 of a removable material. The coating 12 is preferably formed of a material such as boro-silicate glass or alternatively a metal such as aluminum which has substantially the same drawing characteristics as the fiber 10 in a manner to be explained. The coating 12 maintains each of the fibers 10 in spaced relation with each other when the fibers 10 are bundled together to form a matrix block 13 as shown in FIG. 2. The coated fibers 10 may be formed by various known techniques, for example, as described in U.S. Patent 3,004,368, entitled, "Manufacture of Fiber Optical Devices," issued Oct. 17, 1961, and said U.S. patent application S.N. 285,551.

The coated fibers 10 are cut into suitable lengths and placed in side by side parallel relation with respect to each other with their longitudinal axis 11 aligned to form a bundle 14, as shown in FIG. 2. The bundle 14 of fibers 10 may then be placed within a relatively thin walled glass tube 15 preferably formed of the same type of borosilicate glass, as the coating 12. Following the assembly of the bundle 14 within the tube 15, the assembly is drawn in the manner described in said U.S. Patent No. 3,004,368 to form an integral light conducting matrix block 13 having a plurality of aligned and secured fibers 10. During the drawing operation, the block 13 becomes fused with the fibers 10 retaining their parallel relationship and light transmitting properties. The drawn block 13 is then cut to predetermined lengths by conventional shearing means (not shown).

If the drawing operation has not sufficiently fused the block 13 into an integral block for subsequent operations which may be required in certain applications, the block 13 may be subjected to controlled fusing temperatures in accordance with the characteristics of the glass to achieve the desired fusing while maintaining the integrity of the fibers 10. If the preceeding drawing operation has not achieved the final dimensions of the block 13, it may be drawn again to a reduced cross-sectional size until the desired cross-sectional dimensions are obtained.

With miniaturized units it is difficult to accurately provide a desired contour 16 as indicated by the dotted lines of FIG. 2 by using known etching techniques to remove the removable coating 12 from between the fibers 10. The etching process as disclosed in said U.S. Patent No. 3,004,368, does not provide an accurate contour 16 when utilized for very small blocks 13 but the random progression of the etchant results in an extremely uneven and unpredictably etched contour that is unsatisfactory.

Figure 3:
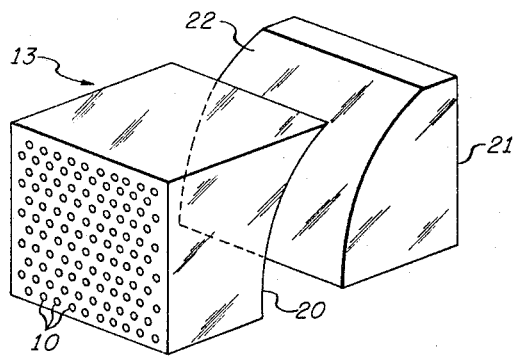
FIG. 3 is a perspective view showing the block of FIG. 2 machined to a predetermined contour and a matching base member with the mating surfaces adjacent.

In order to overcome this deficiency of the prior art and to provide an accurate contour, the present invention utilizes additional steps including the step of accurately machining the desired contour in one end of the block 13, as shown in FIG. 3, an accurately contoured surface 20 which is precisely controlled to provide a predetermined shape in order that the fibers 10 have varying lengths for example, as shown in FIG. 3, longer at the top of the block 13 and progressively shorter near the bottom.

Figure 4:
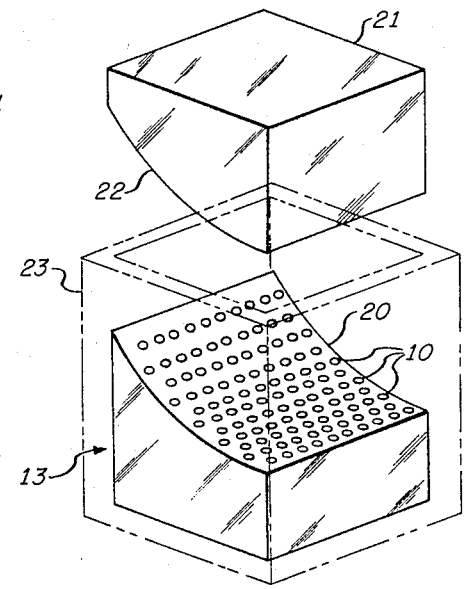
FIG. 4 is a perspective view partially in phantom showing the step of fusing the base member to the block.
Figure 5:
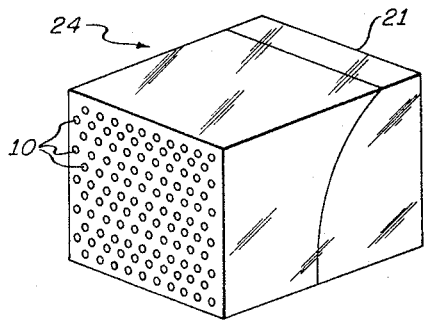
FIG. 5 is a perspective view showing the fused composite unit.

To provide a support from which the fibers 10 may be secured in cantilevered fashion, a base member 21 formed preferably of the same material as that of the fibers 10 has a surface 22 machined or ground therein to mate with the surface 20 of the block 13 as shown in FIG. 3. As shown in FIG. 4, the block 13 may be fused to the base member 21 in a fixture 23, in which the base member 21 is aligned with its surface 22 adjacent to the matching surface 20 of the block 13. The mating surfaces 20 and 22 are then brought to a common fusion temperature by heating in order that the fibers 10 fuse to the base member 22 to become an integral composite unit 24 as shown in FIG. 5. Alternatively, the composite unit 24 may be formed by pouring molten flint glass into the fixture 23 as shown in FIG. 4. In either event, the composite unit 24 is then cooled at a rate which will minimize internal stresses.

After the composite unit 24 is formed, the extremities of the fibers 10 may be lapped flat to provide a high optical finish as disclosed in said U.S. patent application S.N. 285,551.

Figure 6:
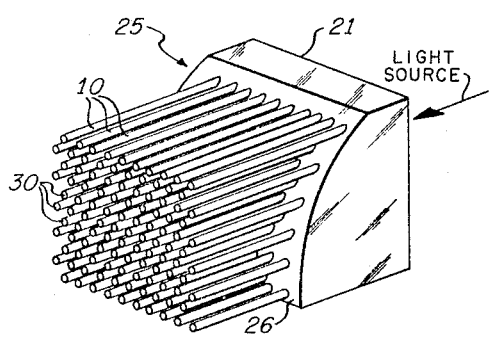
FIG. 6 is a perspective view showing an array formed at the completion of the etching step.

The fused, composite unit 24 is then immersed in hydrochloric acid which attacks and disintegrates the borosilicate glass wall as well as the coating 12 which surrounds each of the fibers 10. The hydrochloric acid does not attack the flint glass fibers 10 nor the flint glass base member 21 and consequently when the etching process is completed, the resulting device, as shown in FIG. 6, is an array 25 having a solid base member 21 with the fibers 10 secured by fusing thereto. The fibers 10 project from the base member 21 in cantilevered fashion from an interface 26 formed by the extremities of the fibers 10 which is defined by the surface 20 fusing with the surface 22. The interface 26 has been very accurately controlled to provide a predetermined contour in order that the fibers 10 extend in varying controlled lengths from the base member 21 in substantially parallel relation with respect to each other and are responsive to varying resonant frequencies when the array 25 is vibrated, in the manner disclosed in said U.S. patent applications S.N. 185,064 and 285,551.

In accordance with the teachings of U.S. patent No. 3,004,368 the etching or leaching of the borosilicate glass can be appreciably speeded up by removing the unit 24 from the hydrochloric acid bath at intervals during the leaching process and washing away the powdered silica deposit which results from the action of the hydrochloric acid on the borosilicate glass. The silica deposit may be removed by washing the unit 24, preferably with distilled water, or applying steam thereto. The water or steam will remove the silica deposit whereupon the unit 24 is again immersed in the hydrochloric acid to continue the leaching of the borosilicate glass.

In most applications of the array 25, for example as disclosed in said U.S. patent applications S.N. 185,064 and 285,551, it is desirable to have the light from the light source indicated by the legend in FIG. 6 to be transmitted through the array 25 to emanate only from the ends 30 of the fibers 10. In this event it is desirable to block the light which would otherwise be transmitted through the transparent base member 21 and out the interface 26 except for that portion transmitted through the fibers 10. To accomplish this, an opaque material 27 is applied to the interface 26, for example, by means of internally plating using an electroless nickel bath of the type disclosed in U.S. Patent No. 2,532,283, entitled, "Nickel Plating by Chemical Reduction," issued Dec. 5, 1950, to Abner Brenner and Grace Riddell. In this process the array 25 is subjected to the following sequence of operation:

(1) Immersion in a wetting agent such a sodium lauryl sulphate;
(2) Rinsing in cold water;
(3) Immersion in a sensitizer such as stannous chloride;
(4) Rinsing in cold water;
(5) Soaking in an activator solution such as palladium chloride;
(6) The lapped fiber ends 30 and the surface 31 of the base member 21 adjacent the light source are sequentially placed in contact with a flat surface that is wetted with a thin film of a polyvinyl stop off in order that the fiber ends 30 and the surface 31 will not be plated in the subsequent step of the electroless nickel bath. The fiber ends 30 are wetted in this manner to prevent capillary attraction forces from causing the array 25 to fill with stop off which probably would occur if the fiber ends 30 were immersed;
(7) Then the array 25 is immersed in an electroless nickel bath in accordance with said U.S. Patent No. 2,532,283 for a duration which plates the desired thickness of nickel on the interface 26, the fibers 30 and the base member 21 except those portions covered by the stop off;
(8) The array 25 is then rinsed in water.
(9) The array 25 is immersed in acetone which dissolves the stop off.
(10) Finally the array 25 is placed in a vacuum oven and dried.

Figure 7:
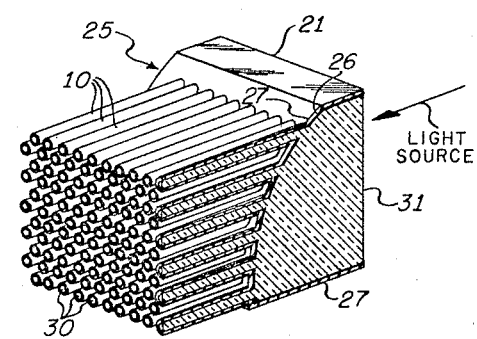
FIG. 7 is a cut-away view of FIG. 6 showing the step of coating of the base member.

The results as shown in FIG. 7 is an opaque material 27 which has been plated on the surface 22 around the ends of the fibers 10 secured to the interface 26 of the base member 21 which blocks all of the light transmitted through the array 25 except that transmitted through the fibers 10 which emanates from the ends 30. The metallic coating which is plated on the fibers 10 except for the ends 30 thereof is of such a minute thickness that it does not adversely effect the vibrating characteristics of the fibers 10.

Although the present invention has been explained with respect to utilizing fibers 10 and a base member 21 that are identical, it will be appreciated that the determining characteristics are based upon the application for which the array 25 is to be used. For example, it will be appreciated that to accomplish the transmission of light through the fibers 10, the base member 21 may be of any transparent material to which the fibers 10 will fuse or may be secured consistent with the intended use of the array 25. Further, the opaque deposit 27 on the interface 26 to block light may be applied in other ways such as vapor deposition.

Of course, if the coating material 12 is metallic such as aluminum, then the etchant instead of being hydrochloric acid would be one suitable for the particular metal, such as, sodium hydroxide for aluminum.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. The method of producing a frequency responsive fiber optical device from a plurality of flexible, light conducting fibers, including the steps of,
   (a) aligning the longitudinal axes of said plurality of fibers to be substantially parallel with respect to each other into a side-by-side bundle,
   (b) spacing each of said fibers of said bundle with respect to each adjacent fiber by means of a removable material to permit at least one end of each of said fibers to vibrate freely when said material is removed,
   (c) side-by-side fusing of said fibers of said bundle into an integral unit by means of said material,
   (d) shaping said unit to have a curved contour which defines the varying lengths associated with a plurality of frequencies of said fibers,
   (e) shaping a base member of a material identical to that of said fibers to have a complementary curved contour with respect to said curved contour of said unit,
   (f) fusing said unit and said base member by means of said contours in order that when the material interspersed between said fibers is removed; said fibers are secured to said base member, have varying resonant frequencies and are adapted to transmit energy through said base member and said fibers,
   (g) removing the material from between said fibers to permit vibration of individual fibers to provide an array of fibers responsive to a plurality of frequencies and adapted to transmit energy, and
   (h) treating portions of said array with an opaque coating to prevent transmission of said energy except via said fibers.

2. The method of producing a frequency responsive fiber optical device from a plurality of flexible, light conducting fibers, including the steps of,
   (a) coating said fibers with a removable material to a predetermined depth of coating,
   (b) aligning the longitudinal axes of said plurality of coated fibers to be substantially parallel with respect to each other and spaced by means of said removable coating to permit at least one end of each of said fibers to vibrate freely when said coating is removed,
   (c) forming said fibers into an integral unit by means of said coating,
   (d) shaping said unit to have a curved contour which defines the varying lengths associated with a plurality of frequencies of said fibers,
   (e) shaping a base member of a material identical to that of said fibers to have a complementary curved contour with respect to said curved contour of said unit,
   (f) fusing said unit and said base member by means of said contours in order that when the material interspersed between said fibers is removed; said fibers are supported by said base member to have varying resonant frequencies and are adapted to transmit light through said base member and said fibers,
   (g) etching the material from between said fibers to permit vibration of individual fibers to provide an array of fibers responsive to a plurality of frequencies and adapted to transmit light, and
   (h) selectively treating with an opaque coating said array to prevent transmission of said light except via said fibers.

3. The method of producing a frequency responsive fiber optical device from a plurality of flexible, light conducting fibers, including the steps of,
   (a) aligning the longitudinal axes of said plurality of fibers to be substantially parallel with respect to each other into a side-by-side bundle,
   (b) spacing each of said fibers of said bundle with respect to each adjacent fiber by means of a removable material to permit at least one end of each of said fibers to vibrate freely when said material is removed,
   (c) side-by-side fusing of said fibers of said bundle into an integral unit by means of said material,
   (d) shaping said unit to have a curved contour which defines the varying lengths associated with a plurality of frequencies of said fibers,
   (e) shaping a base member of a material identical to that of said fibers to have a complementary curved contour with respect to said curved contour of said unit,
   (f) fusing said unit and said base member by means of said contours in order that when the material interspersed between said fibers is removed; said fibers are secured to said base member, have varying resonant frequencies and are adapted to transmit light through said base member and said fibers,
   (g) removing the material from between said fibers to permit vibration of individual fibers to provide an array of fibers responsive to a plurality of frequencies and adapted to transmit energy,
   (h) treating portions of said array with an opaque coating to prevent transmission of said energy except via said fibers, and
   (i) coating said fibers with a metallic coating except for the extremities thereof.

References Cited

UNITED STATES PATENTS

| | | | |
|---|---|---|---|
| 2,457,981 | 1/1949 | De Forest | 65—4 X |
| 2,504,666 | 4/1950 | Duncan | 84—94 |
| 2,992,516 | 7/1961 | Norton | 65—4 |
| 2,995,970 | 8/1961 | Hicks et al. | 65—4 |
| 3,166,395 | 1/1965 | Hicks | 65—4 |
| 3,265,480 | 9/1966 | Hicks | 65—4 |

OTHER REFERENCES

Popular Science, April 1963, vol. 182, No. 4, entitled, "Tell It To Sceptron," pp. 120 and 121.

DONALL H. SYLVESTER, *Primary Examiner.*

F. W. MIGA, *Assistant Examiner.*